US009216510B2

(12) United States Patent  (10) Patent No.: US 9,216,510 B2
Jurmain et al.  (45) Date of Patent: *Dec. 22, 2015

(54) REMOTE VEHICLE CONTROL SYSTEM

(71) Applicant: iRobot Corporation, Bedford, MA (US)

(72) Inventors: Jacob Curtis Jurmain, Hanover, NH (US); Aaron John Powers, Arlington, MA (US); Marc Vollenweider, Kirkland, WA (US); Jeffrey Joseph Berkley, Seattle, WA (US)

(73) Assignee: iRobot Corporation, Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/172,546

(22) Filed: Feb. 4, 2014

(65) Prior Publication Data

US 2014/0156151 A1 Jun. 5, 2014

Related U.S. Application Data

(63) Continuation of application No. 12/058,656, filed on Mar. 28, 2008, now Pat. No. 8,682,502.

(60) Provisional application No. 60/908,667, filed on Mar. 28, 2007, provisional application No. 60/908,715, filed on Mar. 29, 2007, provisional application No. 60/960,446, filed on Sep. 28, 2007.

(51) Int. Cl.
B25J 13/02 (2006.01)
B25J 3/04 (2006.01)
B25J 5/00 (2006.01)
B25J 9/16 (2006.01)
B25J 19/02 (2006.01)

(52) U.S. Cl.
CPC .. *B25J 13/02* (2013.01); *B25J 3/04* (2013.01); *B25J 5/005* (2013.01); *B25J 9/1689* (2013.01); *B25J 19/023* (2013.01)

(58) Field of Classification Search
CPC ............... B25J 3/00; B25J 3/04; B25J 5/00; B25J 5/007; B25J 9/00; B25J 9/0003; B25J 9/10; B25J 9/1612; B25J 9/1689; B25J 9/1697; B25J 19/023
USPC ................................................ 701/2, 49, 50
See application file for complete search history.

(56) References Cited

U.S. PATENT DOCUMENTS 5,312,217 A    5/1994  Lawrence et al.
6,954,899 B1  10/2005  Anderson
2002/0061710 A1  5/2002  Wong (Continued)

OTHER PUBLICATIONS

Barnes, Mitch et al., "ThrowBot: Design Considerations for a Man-Portable Throwable Robot", In Proceedings of SPIE vol. 5804, Mar. 2005.

(Continued)

*Primary Examiner* — Jerrah Edwards
(74) *Attorney, Agent, or Firm* — Myers Bigel Sibley & Sajovec

(57) ABSTRACT

A method for controlling one or more remote vehicles may comprise manipulating remote dexterous manipulators, translating movement of the remote dexterous manipulators into movement of the one or more remote vehicles, and providing a sliding work window allowing control of the one or more remote vehicles' entire range of motion without sacrificing control resolution.

16 Claims, 7 Drawing Sheets

(56) References Cited

U.S. PATENT DOCUMENTS

2004/0217980 A1 11/2004 Radburn et al.
2008/0231698 A1 9/2008 Kaplan et al.

OTHER PUBLICATIONS

Cheung, Carol et al., "UAV-UGV Collaboration with a PackBot UGV and Raven SUAV for Pursuit and Tracking of a Dynamic Target". In Proceedings of SPIE Defense and Security Conference, Orlando, FL, Mar. 2008.
Jones, Chris et al., "Sentinel: An Operator Interface for the Control of Multiple Semi-Autonomous UGVs", In Proceedings of the Association for Unmanned Vehicles Systems International. Orlando, FL, Aug. 2006.
Lenser, Scott et al., "Practical problems in sliding scale autonomy: A case study". In Proceedings of SPIE Defense and Security Conference, Orlando, FL, Mar. 2008.
Mimic Mantis, Innovative and Cost Effective Tension-Based Haptics, [website page online]. [Retrieved on Jul. 31, 2006]. Retrieved from the Internet: <URL: www.mimic.ws/products/Mimic-Mantis-Brochure>.
Rudakevych, Pavlo et al., "A man portable hybrid UAV/UGV system", In Proceedings of SPIE vol. 6561, Mar. 2007.
Rudakevych, Pavlo et al., "Integration of the Fido Explosives Detector onto the PackBot EOD UGV", In Proceedings of SPIE vol. 6561, Mar. 2007.
Rudakevych, Pavlo et al., "Micro Unattended Mobility System (MUMS)", In Proceedings of SPIE vol. 3713, Jul. 1998.
Rudakevych, Pavlo et al., "PackBot EOD Firing System", In Proceedings of SPIE vol. 5804, Mar. 2005.
Rudakevych, Pavlo. "Wave Control: A Method of Distributed Control for Repeated Unit Tentacles", In Proceedings of SPIE vol. 3839, Aug. 1999.
Schoenfeld, Erik et al., "Door Breaching Robotic Manipulator". In Proceedings of SPIE Defense and Security Conference, Orlando, FL, Mar. 2008.
Sword, Lee et al., "Mobility Enhancements for Ballistically Deployed Sensors", In Proceedings of SPIE vol. 4393, Apr. 2001.
Yamauchi, Brian et al., "Griffon: a man-portable hybrid UGV/UAV", In Industrial Robot: An International Journal, vol. 31 No. 5, 2004.
Yamauchi, Brian. "Autonomous Urban Reconnaissance Using Man-Portable UGVs", In Proceedings of SPIE: Unmanned Ground Vehicle Technology VIII, Orlando, FL, Apr. 2006.
Yamauchi, Brian. "Daredevil: Ultra Wideband Radar Sensing for Small UGVs", In Proceedings of SPIE: Unmanned Systems Technology IX, Orlando, FL , Apr. 2007.
Yamauchi, Brian. "PackBot: A Versatile Platform for Military Robotics", In Proceedings of SPIE vol. 5422: Unmanned Ground Vehicle Technology VI, Orlando, FL. Apr. 2004.
Yamauchi, Brian. "Wayfarer: An Autonomous Navigation Payload for the PackBot", In Proceedings of AUVSI Unmanned Vehicles North America 2005, Baltimore, MD, Jun. 2005.
Yamauchi, Brian. The Wayfarer Modular Navigation Payload for Intelligent Robot Infrastructure, In Proceedings of SPIE vol. 5804: Unmanned Ground Technology VII, Orlando, FL, Mar. 2005.
Yamauchi, Brian. "All-Weather Perception for Small Autonomous UGVs". In Proceedings of SPIE Defense and Security Conference, Orlando, FL, Mar. 2008.

REMOTE VEHICLE CONTROL SYSTEM

PRIORITY

This application is a continuation application of pending U.S. patent application Ser. No. 12/058,656, filed Mar. 28, 2008, which claims priority to U.S. Provisional Patent Application No. 60/908,667 filed Mar. 28, 2007, U.S. Provisional Patent Application No. 60/908,715 filed Mar. 29, 2007, and to U.S. Provisional Patent Application No. 60/960,446 filed Sep. 28, 2007, which are incorporated by reference herein in their entirety.

FIELD

The present invention relates generally to a system and method for controlling one or more remote vehicles, and more particularly to a system and method having the capability to intuitively control more than one remote vehicle with quick switching between modes of operation of each remote vehicle separately, and a sliding work window interface for facilitating control throughout a remote vehicle's full range of motion.

INTRODUCTION

Hazardous materials (HazMat) represent a complex and significant danger for emergency and healthcare workers. Disasters involving exposure to hazardous materials are relatively rare events, but they represent one of the most common disasters that occur in Community settings.

Manipulator robots such as that shown in FIG. 1 are tools that allow increased safety and capability for HazMat response and other tasks such as, for example, explosive ordnance disposal. They can allow access to areas denied to humans, and perform missions too dangerous or expensive for humans to reasonably attempt. Unfortunately, their usefulness can be limited by difficulties in controlling remote manipulators. To successfully teleoperate a remote vehicle with a manipulator arm, a user may be required to simultaneously use six controls that are split between three joints on the robot's arm, robot hand spin, and robot hand open/close.

Existing remote vehicle arm teleoperation controls are complex and can be unintuitive because there are few physical parallels between controller inputs (e.g., buttons, joysticks or pucks) and a remote vehicle arm. Functions may be arbitrarily assigned to unintuitive control motions. Therefore, it can take time to learn and use such controllers, and often a reference must be used and controls memorized. Becoming proficient with a manipulator arm of a remote vehicle can therefore be more a feat of memorization than finesse. The consequence is that users can require a long familiarization period before they can effectively operate a remote vehicle. Unintuitive controls may also increase the risk of inappropriate actions, particularly during stressful situations. Additionally, existing controllers do not provide depth perception and therefore depth of remote vehicle arm movement can be hard to gauge.

Further, manipulator arms are inherently difficult to position. This issue can be independent of operator skill. Existing manipulator arms provide no touch feedback to the operator, so its position relative to its environment can only be judged visually, and technical and mechanical limitations permit only a restricted field of vision and slow pan rate as compared to the human eye. Furthermore, the video feed of the manipulator arm necessarily arrives at a user view screen, making it effectively monocular even with multiple cameras, disallowing depth perception. Consequently, manipulation tasks can take ah undesirably long time to perform. For more complex manipulation tasks, such as door opening, the time required can be so long as to make it impractical, for field operations.

Remote vehicle operation is a specialized skill requiring training and practice. Training and practice sessions often consist of physical mock-up missions that the operators make themselves. These missions take time to plan and there is no established set of common practices. Therefore, they may not cover all scenarios that operators are likely to encounter.

HazMat incidents in fixed facilities account for more casualties than any other type of incident. For an explosion within a laboratory causing a chemical spill, for example, first responders wearing HazMat suits approach and enter a building with an unknown level of structural integrity, open doorways, and navigate hallways with potentially impaired vision due to smoke or debris or lack of lighting. Once at the scene of the incident, the responder must explore the area, determine the nature of the event, sample possible hazardous materials that are present, and exit the environment. FIG. 2 illustrates a timeline for a typical HazMat response. Fixed facility incidents can require the most sophisticated behavior on the part of a remote vehicle (door opening, indoor navigation, etc.).

Door opening can be a crucial task for navigating through buildings. It is a complex and difficult manipulation task for teleoperated remote vehicles. Remote vehicles enabled with manipulators can open doors when operated by experienced users, but, due to the limitations of current telemanipulation control (as discussed above), even experienced users can take a great deal of time opening even a simple door.

SUMMARY

Various exemplary embodiments of the present invention may address one or more of the above-mentioned issues. Other features and/or advantages may become apparent from the description which follows.

Certain embodiments of the present teachings provide a method for controlling one or more remote, vehicles which comprises manipulating, remote dexterous control devices, translating movement of the remote dexterous control devices into movement of the one or more remote vehicles, and providing a sliding work window allowing control of the one or more remote vehicles' entire range of motion without sacrificing control resolution.

Certain embodiments of the present teachings provide a method for controlling one or more remote vehicles, comprising switching to a first, control mode for a first remote dexterous control device; manipulating the first remote dexterous control device; translating movement of the first remote dexterous control device into movement of a first remote vehicle in accordance with the first control mode; switching to a second control mode for the first remote dexterous control device; manipulating the first remote dexterous control device; translating movement of the first remote dexterous control device into movement of a first remote vehicle in accordance with the second control mode; switching to a first control mode for the second remote dexterous control device; manipulating the second remote, dexterous control device; translating movement of the second remote dexterous control device into movement of a second remote vehicle in accordance with the first control mode; switching to a second control mode for the second remote dexterous control device; manipulating the second remote dexterous control device; translating movement of the second remote dexterous control device into movement of a second remote vehicle in accordance with the second control mode; and providing a sliding work window allowing control of the remote vehicles' entire range of motion during manipulation of at least one of the remote dexterous control devices without sacrificing control resolution.

Certain embodiments of the present teachings provide a system for controlling one or more remote vehicles, comprising a computer in communication with the one or more remote vehicles; remote dexterous control device in, communication with the computer; one or more programs running on the computer for translating movement of the remote dexterous; control devices into movement of at least one of the one or more remote, vehicles; and a sliding work window interface allowing control of the one or more remote vehicles' entire range of motion without sacrificing control resolution.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

BRIEF DESCRIPTION OF THE DRAWINGS

Features and, advantages of the claimed subject matter will be apparent from the following detailed description of embodiments consistent therewith, which description should be considered with reference to the accompanying drawings, wherein:

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION OF VARIOUS EMBODIMENTS

Reference will now be made to various embodiments, examples of which are illustrated in the accompanying drawings. However, these various exemplary embodiments are not intended to limit the disclosure. To the contrary, the disclosure is intended to cover alternatives, modifications, and equivalents.

The present invention contemplates a control, system and method that make remote vehicle manipulator arm control more intuitive and may additionally provide feedback or touch feedback to the user. Haptic feedback is precise multi-DOF force feedback. It can allow users to perceive non-visual cues essential to complex manipulation tasks, such as resistance to motion or grip force. The input device need not provide haptic feedback, and exemplary embodiments of the invention contemplate using a remote dexterous control device without haptic feedback.

In accordance with the present teachings, the user can quickly and easily toggle among modes of remote vehicle control, such as drive and manipulate, with the same hand that is controlling movement of the vehicle within the selected mode. Exemplary embodiments of the present invention contemplate the control system and method allowing a user to control the movement of the two remote vehicles with quick switching between modes for each remote vehicle separately. Further, various exemplary embodiments contemplate a training simulator system that allows responders to conveniently learn and practice operation of a remote vehicle. The remote vehicle may include, for example, an iRobot® PackBot® explosive ordnance disposal (EOD) device used for explosive ordnance disposal.

Figure 4:
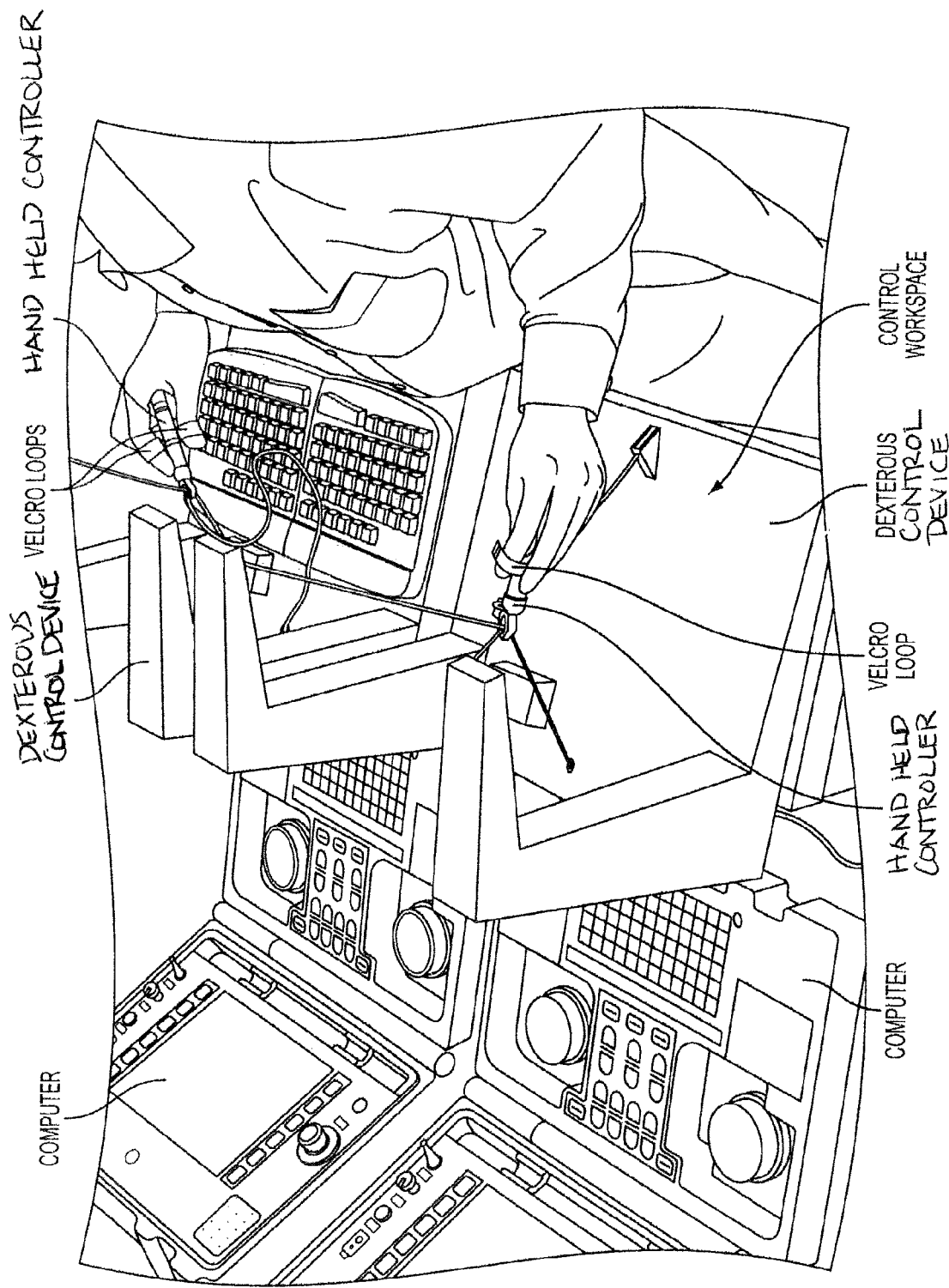
FIG. 4 illustrates an embodiment of a control system implementation for use with certain embodiments of the present teachings.

Making remote vehicle manipulator arm control more intuitive and physically analogous can be achieved in accordance with the present teachings by using a remote dexterous control device such as, for example, a Mimic Mantis or Mantis Duo hand held controller, which employs three wires or cables to create resistance in a small, handheld controller that the user can move around a workspace. The workspace can be, for example, a cubic foot in volume. An exemplary implementation of a control system is illustrated in FIG. 4. Alternatively, the present teachings contemplate utilizing a remote dexterous control device including a waldo such as Central Research Laboratories' telemanipulators that use electronic, hydraulic, or mechanical linkages allowing a user to control a manipulator arm. The remote dexterous control device can alternatively include a Logitech® tracker such as an Ultrasonic Tracking System, a Novint® Falcon® game controller, a 3Dconnexion® Space Navigator® mouse, a 3Dconnexion® Spaceball 5000 motion controller, and a Simple Grip Control System joystick.

Dexterous manipulation includes control of a remote vehicle manipulator arm in 3D, with the motions of the manipulator arm slaved to the motions of the operator's own arm and hand. It can be highly intuitive, fast, and easy to use. A remote dexterous control device can be capable of 7 degrees of freedom sensing (of movement) and 3 or 4 degrees of freedom feedback. The 7 degrees of freedom can include 3 translational, 3 rotational, and one gripper closure. The feedback can include translational high-fidelity force feedback. Controlling the remote vehicle's movement via a remote dexterous control device allows the remote vehicle, and in particular a manipulator arm, to mimic the user's hand movements.

As stated above, the hand held control device does not have to be at the end of wires, as in the dexterous control device illustrated in FIG. 4, but can be in free space and tracked or also mechanically tracked in many ways. Mechanical tracking can be advantageous because the gripper remains in position when released, as does the remote vehicle's arm. A remote dexterous control device for each remote vehicle includes a drive-manipulate mode selection button, toggle, switch, or other control mechanism that can be manipulated, for example with the user's thumb or other body part not otherwise engaged in manipulation of the remote vehicle, to switch between modes of operation of the remote vehicle to be controlled, such as drive and arm manipulation modes. Thus, the mode of each controlled remote vehicle can be switched separately and easily without unnecessary interruptions to arm manipulation. Further, the dexterous control device can accommodate functionality allowing the user's thumb and forefinger to open and close the remote vehicle's gripper.

Figure 1:
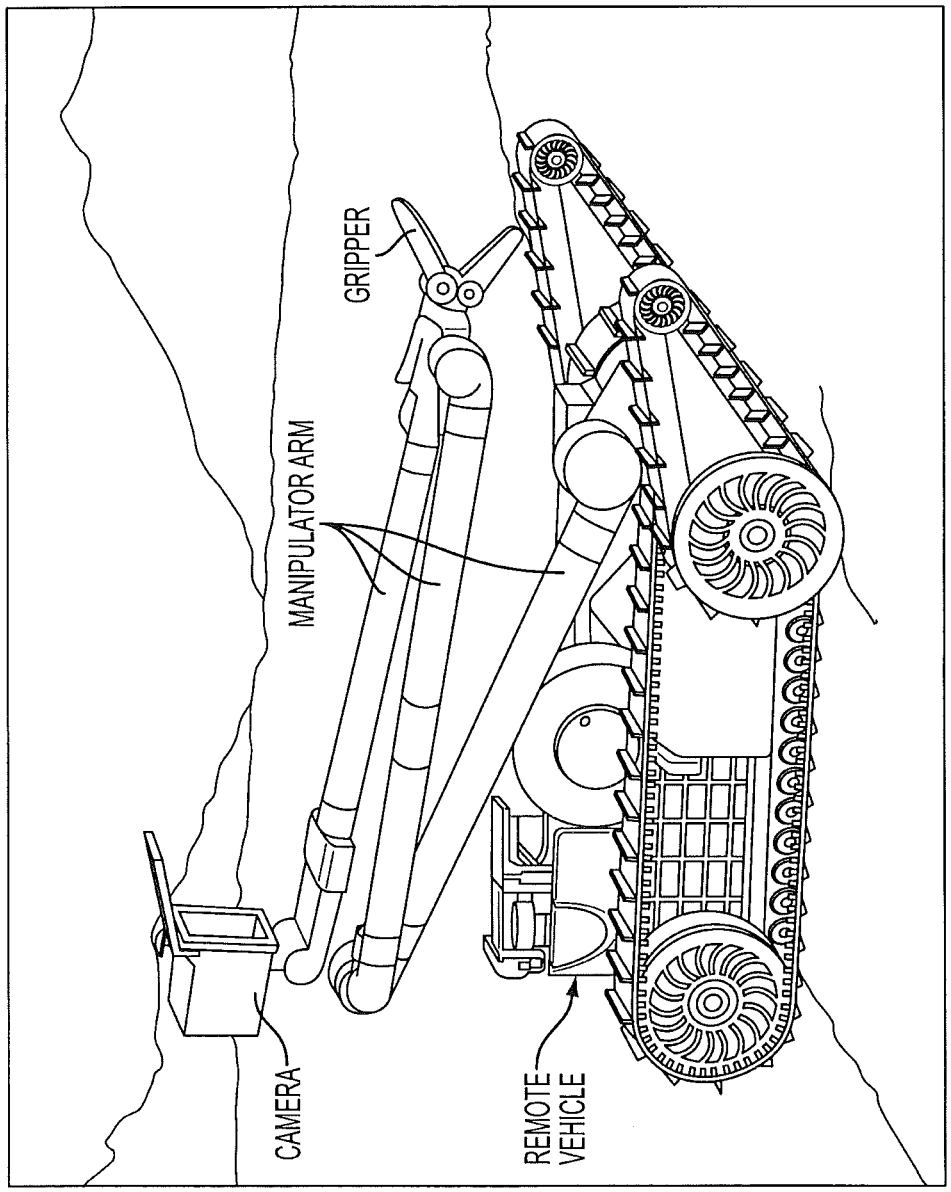
FIG. 1 illustrates a remote vehicle having a manipulator arm.
Figure 2:
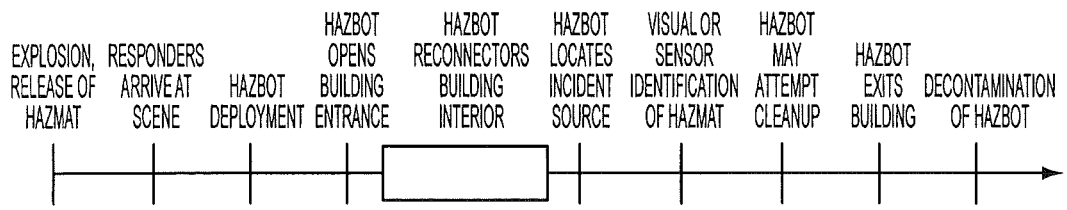
FIG. 2 is a timeline of a HazMat response.
Figure 2:
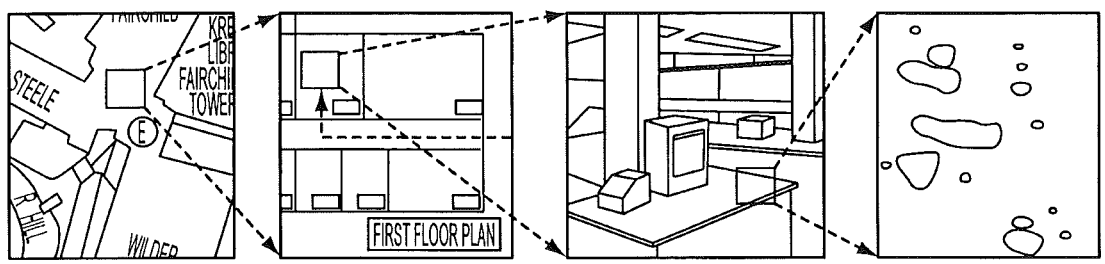

In use, the user manipulates the hand held controller of the remote dexterous control device and the position of the hand held controller is recorded and translated to a target position for an end effector. An end effector is a device at the end of a robotic arm, which is designed to interact with the environment. The exact nature of the end effector can depend on the application of the robot. As illustrated in FIG. 1, the end effector can be a gripper such as provided in a PackBot® EOD.

Figure 3:
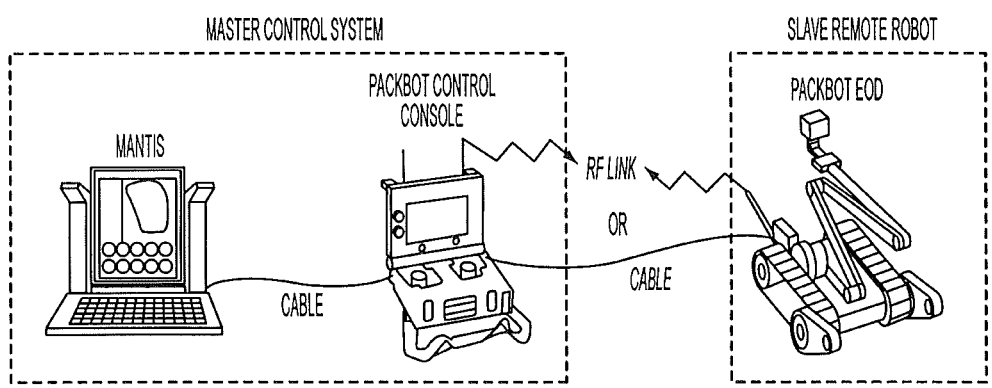
FIG. 3 illustrates the master/slave nature of an exemplary control system in accordance with the present teachings.

In certain embodiments, the system of the present teachings can be implemented as a master/slave teleoperation system, as illustrated in FIG. 3. It should be understood however, that the exemplary master/slave teleoperation schematic illustrated in FIG. 3 includes a single remote dexterous control device and a single remote vehicle, whereas various exemplary embodiments of the present invention contemplate controlling multiple remote vehicles with multiple remote dexterous control devices. Teleoperation can be defined as real-time piloting via remote video. According to certain embodiments, the master includes intuitive remote dexterous control devices that may provide force feedback, and a portable control console. According to certain embodiments, the remote dexterous control device is rugged enough for deployment in the field and simple enough for rapid user adoption following appropriate training. The slave component of the system can be a remote vehicle such as a standard iRobot® PackBot® EOD used for explosive ordnance disposal with a standard manipulator arm that enables opening of doors, manipulation of hazardous materials, and potential cleanup. The remote vehicle can provide vision, bandwidth, rugged deployment, and survivability in extreme environments.

Figure 5:
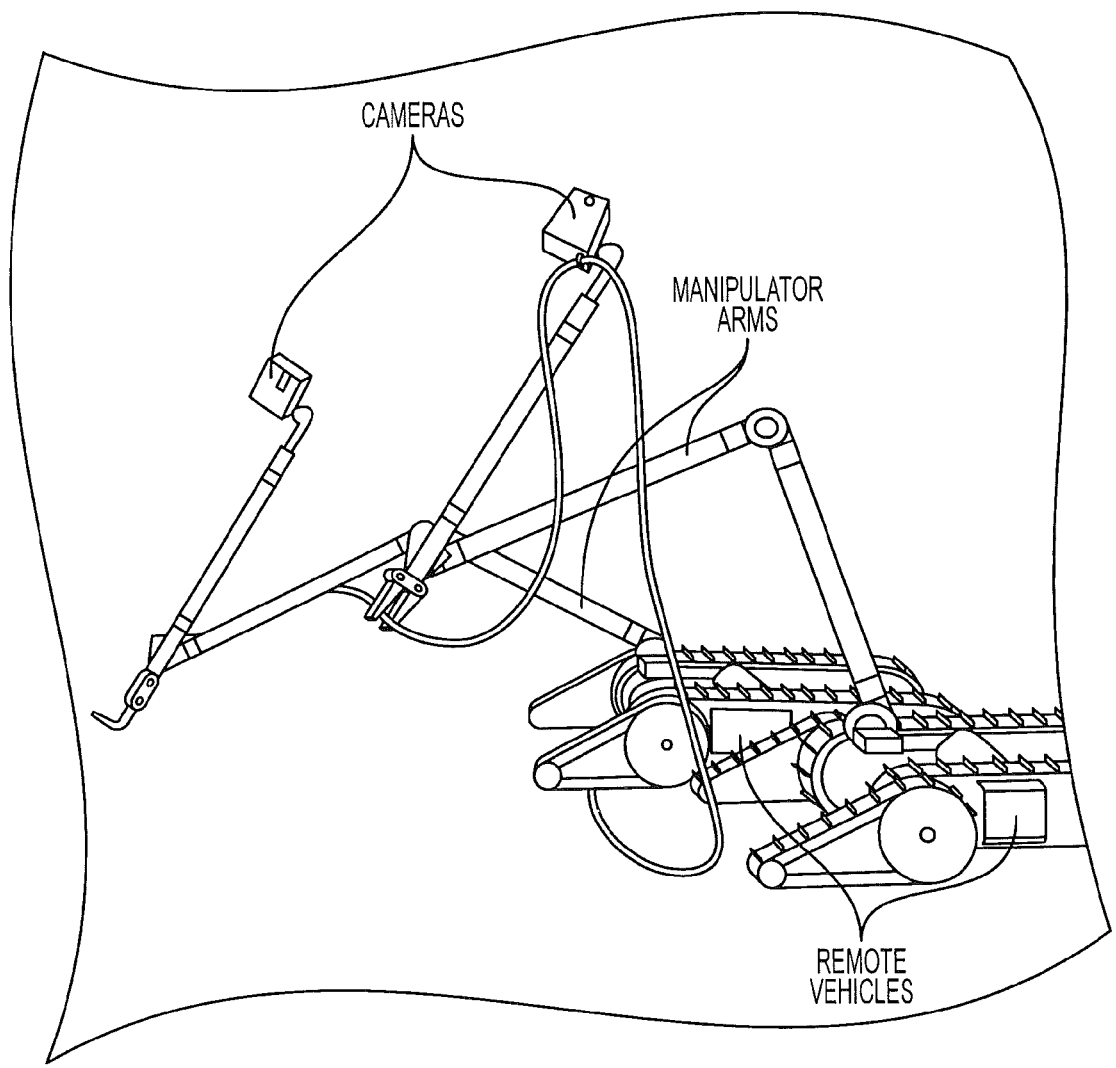
FIG. 5 illustrates two remote vehicles with manipulator arms that can be controlled by the dexterous control device of FIG. 4.

In certain embodiments of the present teachings, the remote dexterous control device is employed as a peripheral to a portable computer such as, for example, a tablet PC or a laptop. FIG. 4 illustrates an exemplary implementation of a system for use in an embodiment of the present teachings. The embodiment employs the following hardware: two portable computers such as laptops or tablet PCs, with power supplies (e.g., batteries); two remote vehicles with power supplies (e.g., batteries) (see FIGS. 5 and 6); and dexterous control devices such as two Mimic Mantises with grip attachments or a single Mimic Mantis Duo having two grip attachments. Power supplies for the dexterous control devices, a computer Ethernet or power/Ethernet tether, crossover Ethernet cables, and Ethernet can also be employed. One skilled in the art will understand that a single portable computer can be used instead of two portable computers. Other computer networking technologies besides Ethernet can be used in embodiments of the present teachings.

To assemble the exemplary implementation illustrated in FIG. 4, the portable computers can be placed adjacent the dexterous control devices, and the portable computer and dexterous control devices can be connected to respective power supplies. The portable computers and the dexterous control devices can be connected via an Ethernet tether, crossover cables, and Ethernet couplers. After the portable computers and the remove vehicles are powered on, the user can log into each portable computer and enter a respective remote vehicle serial number and communication method. The dexterous control devices are then powered on and booted, preferably automatically connecting to the portable computer.

In the exemplary embodiment illustrated in FIG. 4, the user can hold the Mantis handheld controller by putting his or her forefinger through the hand held controller's Velcro® loop with adjacent thumb and middle finger on the textured metal cylinder and the 4th and 5th fingers support beneath. Alternatively, the user can put his or her thumb in the Velcro® loop and hold the metal cylinder between fore and middle fingers. One of the user's unlooped fingers, for example the thumb, is used to switch among two or more modes of operation of the remote vehicle, such as a drive mode and a manipulated mode. In a Mantis hand held controller, a mode switch, button, or toggle can be located, for example, on the textured metal cylinder of the hand held controller in close proximity to the user's fingers. For other types of dexterous control devices, one skilled in the art will understand the possible location(s) of such a mode switch, toggle, or button to be in suitable proximity to the user's fingers.

In the exemplary implementation of FIG. 4, the user's index finger and thumb are inserted through the hand held controller's Velcro® loops, and the textured metal cylinder is held loosely among the remaining fingers. The fingers held within the Velcro® loops are opened and closed to open and close fingers of a gripper of a controlled remote vehicle (see FIGS. 5 and 6) accordingly. Movement of the metal cylinder within the control workspace (the area of the dexterous control device in which the user manipulates the metal cylinder and Velcro® loops) translates to corresponding general movement of the manipulator arm and gripper of the controlled remote vehicle. A mode switching device such as a button, toggle, or switch located on the textured metal cylinder is activated by a finger of the user that is not inserted in the Velcro® loops. The mode switching device is positioned in close proximity to the activating finger to allow simplicity of user activation. Such simplicity can allow the user to activate the mode switching device to change modes of control (among, for example, drive and manipulate modes) of the remote vehicle with minimal or no interruption to ongoing manipulation with the user's other fingers.

According to certain embodiments of the invention, inverse kinematics or resolved motion can be used to calculate the joint positions of the remote vehicle manipulator arm that correspond to movement of the hand held controller of the remote dexterous control device, and then the remote vehicle is commanded to move accordingly. In certain, embodiments of the invention, the control system includes an inverse kinematics engine that translates control input from the dexterous control device to the remote vehicle's manipulator arm. Inverse, kinematics refers to the process of determining the parameters of a jointed flexible object to achieve a desired pose.

Figure 6:
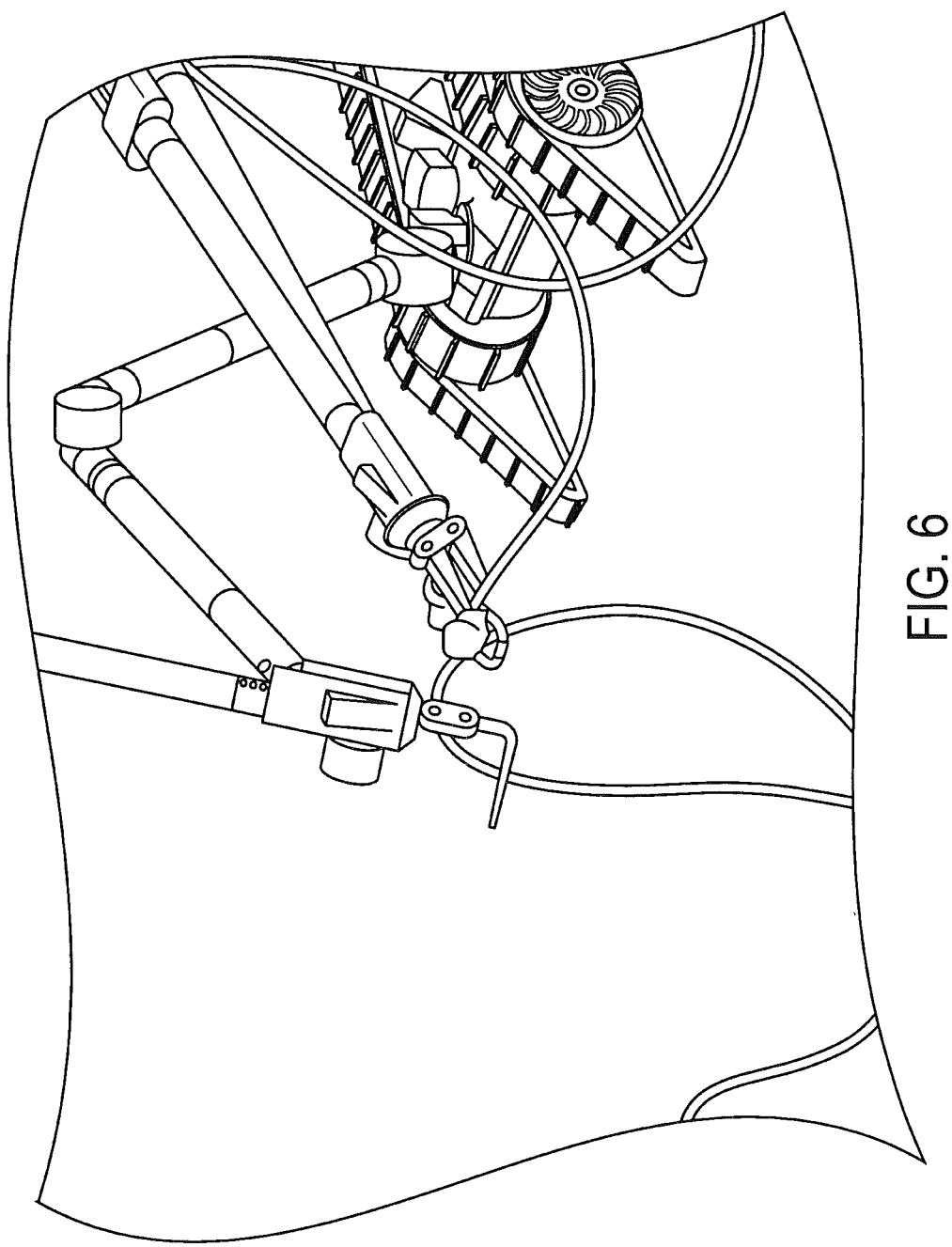
FIG. 6 illustrates further manipulation of the remote vehicles of FIG. 5.
Figure 7:
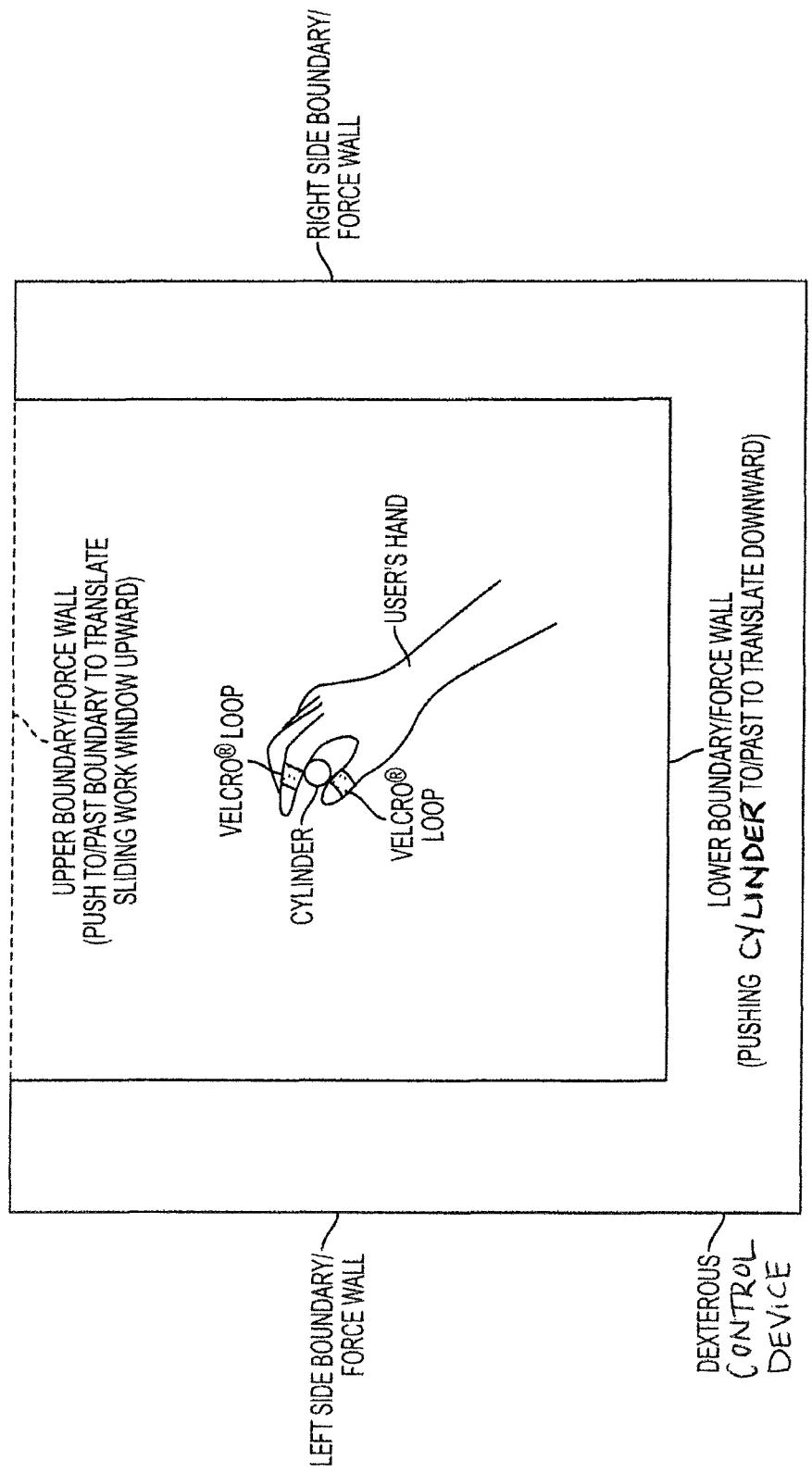
FIG. 7 illustrates a front view of an exemplary embodiment of a workspace for a sliding work window for one of the dexterous control devices of FIG. 4.

FIGS. 6 and 7 illustrate two remote vehicles that can be controlled by the control system implementation illustrated in FIG. 4. Each vehicle can be controlled by its own remote dexterous, control device and, in the illustrated implementation, the left remote vehicle can be controlled with a hand held controller in the user's left hand and the right remote vehicle can be controlled with a hand held controller in the user's right hand to increase intuitive interaction. The remote vehicles can interact cooperatively to, for example, open a door and/or pass an object among themselves. Using a hand held controller in each hand, the user can toggle between modes of operation of the remote vehicles separately, for example between drive and manipulate modes that allow the remote vehicle to navigate and interact with its environment. As an example of an action requiring the remote vehicles to be in differing modes of operation, one vehicle may use its manipulator arm in manipulation mode to open a door, while the other remote vehicle passes through the doorway in a drive mode.

The present invention contemplates using mobile-workspace dexterous position control. Certain embodiments of the system can include a control window (e.g., a display that is 4 inches high by 8 inches wide by one inch deep) that is mapped and scaled to a workspace of the remote vehicle's manipulator (e.g., 1 foot high by 2 feet wide by 3 inches deep). The window displays to the user what the remote vehicle sees (via one or more cameras) and/or the operating environment of the end effector of one or more of remote vehicles' manipulator arms. The remote vehicle's workspace in such an embodiment may be smaller than its actual range of motion (e.g., a 1 foot high by 2 feet wide window of a full 2 foot wide by 4 foot high range of motion), but scaling the workspace up to the size of the remote vehicle's range of motion may lose useful control resolution (motions can be multiplied too many times and are too sensitive and exaggerated).

Certain embodiments of the invention contemplate a solution to this loss of control resolution, in which a control workspace of the dexterous control device is movable within the entire range of motion of the remote vehicle, and movement of the workspace is responsive to movement of the hand held controller to or past a workspace edge. Such an embodiment can facilitate one-to-one correspondence between movement of the hand held controller within the control workspace and corresponding remote vehicle motion. Moving the hand held controller within the control workspace and to the edge of its range of motion causes movement of a corresponding workspace window to accommodate the remote vehicle's full range of motion in a direction corresponding to the direction of the hand held controller's movement, allowing the user to use the remote vehicle's entire range of motion without sacrificing control resolution.

An example of this technique includes movement of the user-manipulated hand held controller within the control workspace of the dexterous control device a distance of two inches in a northward direction relative to the ground plane by movement of the user's hand, e.g., two inches in a northward direction (upward in FIG. 7). The remote vehicle responds to the hand held controller's movement by driving its manipulator arm a distance of two inches in a northward direction relative to the remote vehicle's own ground plane. Additional examples include a clockwise movement of the hand held controller within the control workspace about an axis parallel to the ground plane (by corresponding or other intuitive user hand movement) for a distance equivalent to 90 degrees. The remote vehicle's corresponding movement can include driving appendages attached to its manipulator arm 90 degrees in a clockwise direction about an axis parallel to its ground plane. The result of this rotational movement can be, for example, closing an appendage attached to the arm, similar to flexing human fingers towards the palm to create a fist.

Figure 8:
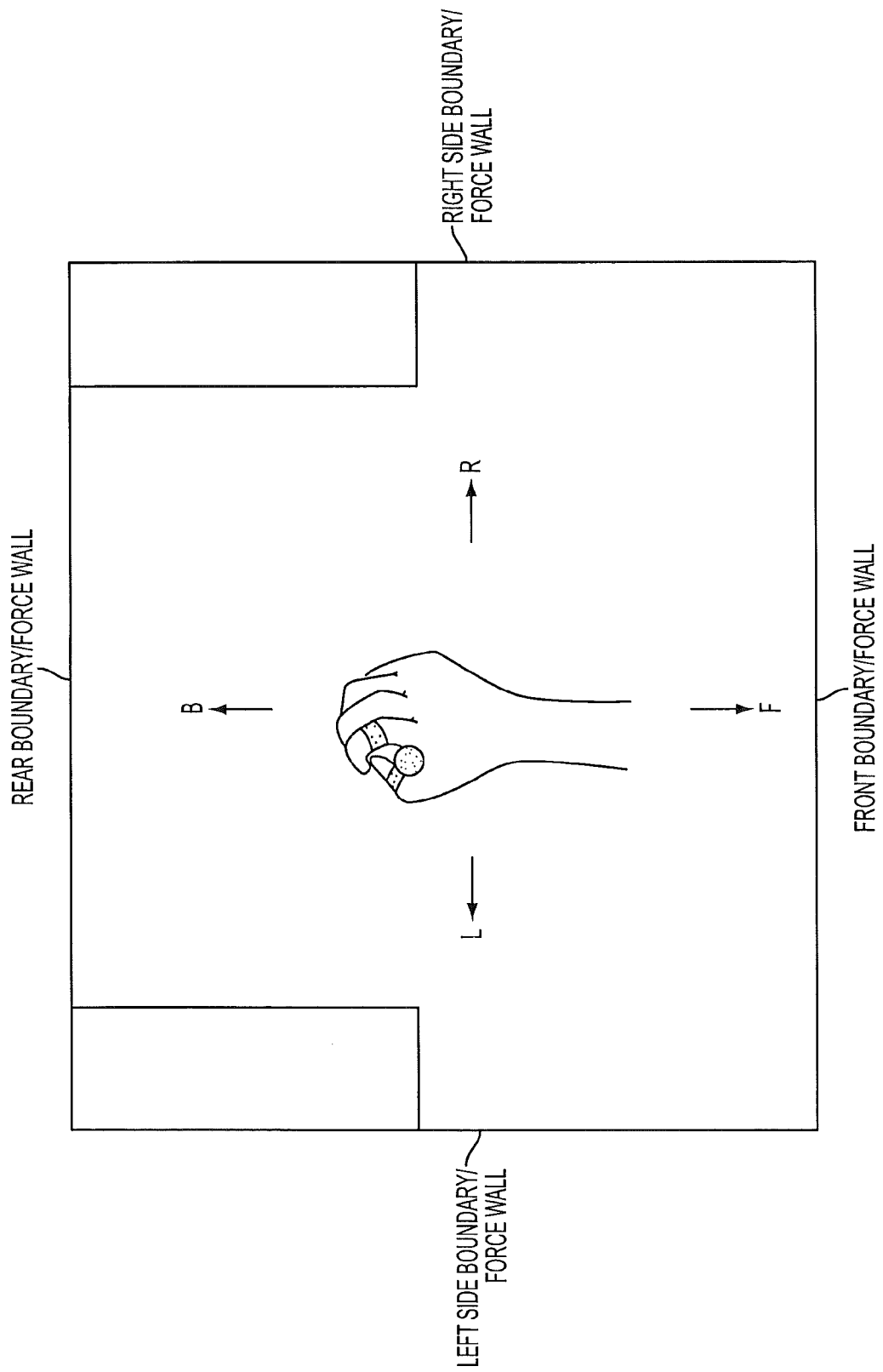
FIG. 8 illustrates a top view of an exemplary embodiment of a workspace for a sliding work window for one of the dexterous control devices of FIG. 4.

One-to-one correspondence of the control workspace dimensions and the remote vehicle's range of motion allows for a finer motor control of actuators attached to the remote vehicle. Such a moveable workspace window can be referred to as a sliding work window (a type of control window), which has an interface that implements an edge detection routine using controller feedback to determine when the user has moved the hand held controller to an edge or perimeter of the controller workspace, also referred to as the sliding work window. When this occurs, the routine accommodates by directing the system to translate the sliding work window in a direction corresponding to the hand held controller's movement and in a manner such that the newly-translated window continues to correspond to the remote vehicle's workspace. Thus, the user can scroll around the remote vehicle's workspace by moving the hand held controller along the edges of the sliding work window. By scrolling within the sliding work window, the user can change which region of the remote vehicle's range of motion to operate in at any particular time. This allows use of a control workspace small enough to allow a high resolution of control, without sacrificing the remote vehicle's controllable range of motion. The edge or perimeter of the control workspace that triggers translation of the sliding, work window can vary in size. An exemplary implementation of a control workspace with such a perimeter is illustrated in FIGS. 7 and 8 for a Mantis dexterous control device such as those illustrated in FIG. 4.

Certain embodiments also include a sliding work window with defined envelopes (or force walls) that occupy a space (a boundary) that surround the control workspace perimeters or edges, and a routine that responds to movement of the hand held controller to a position within an edge envelope or force wall. Such a routine can direct the remote vehicle's control system to accelerate movement of the remote vehicle's actuator or increase a drive speed of the remote vehicle in a direction corresponding to the hand held controller's direction upon contacting the edge envelope or force wall and in response to the hand held controller's position within the envelope. The size of the envelope or force wall may differ for the drive and manipulate modes. For example, the envelope ray comprise only about a one- to two-inch boundary around the display perimeter when in the manipulation mode, allowing about a 1:1 correspondence of user movement and manipulator arm/gripper movement over the majority of the screen. In a drive mode, where 1:1 correspondence is not as critical as in manipulation mode, the envelope or force wall may comprise more of the display perimeter such that acceleration begins fairly quickly after the user begins moving the hand held controller in the desired drive direction.

In certain embodiments of the invention, while the hand held controller is positioned within the envelope, the remote vehicle or the manipulator arm continues to accelerate. Repositioning the hang held controller from the envelope to a position outside of the control envelope causes the routine to send a command to the remote vehicle's control system indicating that the remote vehicle ceases acceleration. During the acceleration/deceleration routine, the control window continues to translate to accommodate the movement of the hand held controller within the control workspace, which corresponds to movement of the remote vehicle's manipulator arm.

Further attributes of the routine may include commanding the remote vehicle's control system to accelerate at a speed representative of the hand held controller's position within the envelope. This attribute would direct continuous increases in acceleration speed as the hand held controller is moved further into the envelope or force wall, and correspondingly would direct continuous decrease in acceleration speed as the hand held controller is moved closer to the control window's interior. The control window continues to translate to accommodate the movement of the hand held controller within the control workspace.

Translation and acceleration functionality can be added to a dexterous control device's control workspace by configuring the internal modeling of the dexterous control device's software to create six envelopes (force walls) at the boundaries of the control workspace, as illustrated in FIGS. 7 and 8. Pushing into the force walls is treated as a command to the sliding work window to translate in the direction of the push. To map this to the remote vehicle, a cylindrical coordinate system can be used for translation of the sliding work window. Thus, pushing into the upper, lower, front (in the direction of arrow F in FIG. 8), or back (in the direction of arrow B in FIG. 8) boundary linearly translates the workspace. Pushing into the left side (in the direction arrow L in FIG. 8) and right side (in the direction of arrow R in FIG. 8) boundary revolves the workspace about a vertical axis that can be centered at the remote vehicle arm joint that meets the remote vehicle chassis.

In certain embodiments of the invention, the remote vehicle may be driven forward (although in manipulate mode) when the user is trying to manipulate the remote vehicle arm to reach something and cannot reach it even when remote vehicle's manipulator arm has reached its full extension. This embodiment could, therefore, in certain desirable circumstances, switch between manipulate and drive modes without the use of a toggle on the hand held controller.

According to various exemplary embodiments, the present invention also contemplates two remote dexterous control devices being used to control the same remote vehicle. In such an embodiment, a first remote dexterous control device can control the manipulator arm and a second remote dexterous control device can drive the remote vehicle. Alternatively, using two remote dexterous control devices to control a single remote vehicle, the sliding work window can be a two-handed differential with skid steered driving in a drive mode and double manipulating in a manipulating mode, similar to a tank.

In certain embodiments of the invention, cameras that provide the viewpoint for manipulating and/or driving the one or more remote vehicles controlled by the dexterous control devices can be situated remotely, for example on their own remote vehicle(s) and video feed from the cameras can be displayed in one or more of the control windows. In other embodiments, a camera is mounted on one or each remote vehicle for providing video feed, of its manipulator arm. When more than one camera is used, each camera's video feed can be displayed in a respective manipulator arm's control window.

In certain embodiments of the present teachings, the torque on all of the remote vehicle manipulator arm joints can be converted to absolute force felt by the end effector. Motor current sensing is used to determine torque on the joints, and the programs uses forward kinematics to determine force on the end effector. Force on the end effector is communicated to the control system, which displays proportional force to the user. Alternatively, the force on the end effector can be communicated to the user by applying forces, vibrations, and/or other motions.

By incorporating haptic feedback into a remote vehicle control system, users gain the ability to remotely "feel" objects being manipulated. Users can also perceive such useful information as the shape and position of door handles, or the rotation of an opening door. Haptic technology refers to technology which interfaces the user via the sense of touch by applying forces, vibrations, and/or motions to the user. This mechanical stimulation can be used to create haptic virtual objects.

The present teachings contemplate intuitively controlling one or more remote vehicles to perform HazMat response tasks. The remote vehicle(s) can navigate a building, passing debris and doors as necessary.

Once the remote vehicle makes its way past doors, it can gather useful information about the environment beyond. Indoor reconnaissance can be central to the remote vehicle's mission, allowing the remote vehicle to give information regarding a status of the environment, including the presence of hazards such as fires, dangerous chemicals, and damage to structural integrity. The remote vehicle can also identify and report objectives, such as people in need of rescue, or sites in need of cleanup. In certain embodiments, the remote vehicle includes illuminators that permit vision with no outside light sources. In certain embodiments, an ultrasound navigation system allows perception and navigation even in smoky rooms where normal vision is obscured.

While within the building, the remote vehicle(s) can use manipulators to sample and collect, specimens, whether the hazardous material is chemical, biological, or nuclear. In certain embodiments of the present teachings, the remote vehicle includes onboard sensors to remotely determine the nature of the hazardous material, without needing to sample the material and return the sample to responders. Returning the sample for testing would require decontamination or isolation of the remote vehicle until the nature of the sample could be determined through other testing methods.

The present teachings contemplate, providing a virtual reality training simulator that can be integrated with the dexterous control device(s) and the remote vehicle control console(s) such as those illustrated in FIG. 4. The virtual reality training simulator can include training in opening doors, navigating indoor environments, and sampling and disposal of hazardous materials. The training simulator can train within a virtual reality using a representation of the remote vehicle. The system, particularly for example the training simulator can be geared toward certain users, for example first responders, incident commanders, emergency management officials, and medical personnel.

The present teachings are applicable to remote vehicles used for other tasks besides HazMat response, for example explosive ordnance disposal (EOD) and other tasks involving the use of a manipulator arm. While the present invention has been disclosed in terms of preferred embodiments in order to facilitate better understanding of the invention, it should be appreciated that the invention can be embodied in various ways without departing from the principle of the invention. Therefore, the invention should be understood to include all possible embodiments which can be embodied without departing, from the principle of the invention set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood, to encompass any and all subranges subsumed therein.

It is noted that, as used in this specification and the appended claims, the singular forms "a," "an," and "the,"

include plural referents unless expressly and unequivocally limited to one referent. Thus, for example, reference to "a restraint device" includes two or more different restraint devices. As used herein, the term "include" and its grammatical variants are intended to be non-limiting, such that recitation of items in a list is not, to the exclusion of other like items that can be substituted or added to the listed items.

It will be apparent to those skilled in the art that various modifications and variations can be made to the sample preparation device and method of the present disclosure without departing from the scope its teachings. Other embodiments of the disclosure will be apparent to, those skilled in the art from consideration of the specification and practice of the teachings disclosed herein. It is intended that the specification and examples be considered as exemplary only.

What is claimed is:

1. A remote vehicle system, comprising:
   a remote vehicle, comprising a manipulator arm having end effector; and
   a portable remote control system, comprising:
      a computer in communication with the remote vehicle and configured to display a view of an environment of the remote vehicle on a display; and
      a remote dexterous control device in communication with the computer and comprising a hand held controller and a workspace in which the hand held controller is manipulated;
      wherein the computer is configured to translate movement of the hand held controller within the control device workspace into corresponding movement of a portion of the remote vehicle in a portion of the remote vehicle environment and is configured to translate the view of the remote vehicle environment on the display in a direction corresponding to movement of the hand held controller within the control device workspace, when the hand held controller is moved to a perimeter of the control device workspace.

2. The remote vehicle system of claim 1, wherein the remote vehicle comprises a manipulator arm having end effector, and wherein the remote dexterous control device is configured to remotely navigate the remote vehicle and to control the manipulator arm and end effector.

3. The remote vehicle system of claim 1, wherein the remote dexterous control device provides haptic feedback.

4. The remote vehicle system of claim 2, wherein force on the end effector is communicated to the remote dexterous control device, which displays proportional force to a user.

5. The remote vehicle system of claim 2, wherein force on the end effector is communicated to the remote dexterous control device, which communicates the force to a user via force, vibration and/or other motion applied to the hand held controller.

6. The remote vehicle system of claim 1, wherein the perimeter of the sliding work window comprises force walls surrounding the workspace, and wherein manipulation of the hand held controller to a position within a force wall causes translation of the sliding work window.

7. The remote vehicle system of claim 1, wherein the perimeter of the sliding work window comprises force walls surrounding the workspace, and wherein manipulation of the hand held controller to a position within a force wall causes accelerated movement of the remote vehicle.

8. The remote vehicle system of claim 1, wherein the hand held controller includes one of a button, a toggle, and a switch.

9. The remote vehicle system of claim 1, wherein the hand held controller can be manipulated by a user body part not otherwise engaged in manipulation of the remote vehicle to switch between the first and second control mode.

10. The remote vehicle system claim 9, wherein the user body part is a finger.

11. The remote vehicle system of claim 1, wherein motions of the manipulator arm and end effector are slaved to motions of a user's body part via the hand held controller.

12. The remote vehicle system of claim 1, wherein the remote vehicle comprises a video camera in communication with the computer.

13. The remote vehicle system of claim 1, wherein the remote dexterous control device comprises one of a hand held controller, a game controller, a mouse, a motion controller, and a joystick.

14. The remote vehicle system of claim 1, wherein the remote vehicle comprises at least one sensor configured to remotely determine the presence of a material without requiring sampling of the material.

15. The remote vehicle system of claim 14, wherein the material is a hazardous material.

16. The remote vehicle system of claim 1, wherein the portable remote control system comprises a virtual reality training simulator.

* * * * *